United States Patent
Kfoury et al.

(10) Patent No.: US 10,035,260 B2
(45) Date of Patent: Jul. 31, 2018

(54) CABLE ACTUATOR ALLOWING INCREASED JOINT CLEARANCE

(71) Applicant: COMMISSARIAT A L'ENERGIE ATOMIQUE ET AUX ENERGIES ALTERNATIVES, Paris (FR)

(72) Inventors: Fares Kfoury, Gif-sur-Yvette (FR); Philippe Garrec, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 280 days.

(21) Appl. No.: 14/777,922

(22) PCT Filed: Mar. 28, 2014

(86) PCT No.: PCT/EP2014/056355
§ 371 (c)(1),
(2) Date: Sep. 17, 2015

(87) PCT Pub. No.: WO2014/161796
PCT Pub. Date: Oct. 9, 2014

(65) Prior Publication Data
US 2016/0288319 A1    Oct. 6, 2016

(30) Foreign Application Priority Data
Apr. 5, 2013  (FR) ..................... 13 53089

(51) Int. Cl.
*F16H 19/06*     (2006.01)
*B25J 9/10*      (2006.01)
*F16H 25/20*     (2006.01)

(52) U.S. Cl.
CPC .......... *B25J 9/104* (2013.01); *F16H 19/0622* (2013.01); *F16H 2019/0695* (2013.01); *F16H 2025/2075* (2013.01)

(58) Field of Classification Search
CPC .. F16H 25/20; F16H 25/12; F16H 2007/0865; F16H 7/10; F16H 2019/0695; F16H 19/0622; F16H 25/2009; F16H 7/12
(Continued)

(56) References Cited

U.S. PATENT DOCUMENTS 4,613,798 A * 9/1986 Baumann .............. F16K 31/046
                                                251/129.11
9,121,481 B2 * 9/2015 Sessions ............. F16H 19/0618
(Continued)

FOREIGN PATENT DOCUMENTS

FR         2 809 464 A1   11/2001
WO   WO-2013022833 A1 *  2/2013  ............. B25J 9/104

OTHER PUBLICATIONS

International Search Report for PCT/EP2014/056355 dated Jun. 18, 2014.

*Primary Examiner* — Victor L MacArthur
*Assistant Examiner* — Randall J Krug
(74) *Attorney, Agent, or Firm* — Sughrue Mion, PLLC

(57) ABSTRACT

A cable actuator comprising a chassis (1), a screw (2) rotatably mounted on the chassis and driven by an electric motor, a nut (4) that engages with the screw and is combined with anti-rotation means such that rotation of the screw under the action of the motor causes an axial displacement of the nut, two cables (10) coupled to the nut on either side of same, the two cables being wound onto respective joint pulleys (11) each rigidly connected to a same joint shaft (12) and in which the joint pulleys have a helical groove, the helical grooves of the pulleys extending in opposing directions.

7 Claims, 2 Drawing Sheets

(58) Field of Classification Search
USPC ......... 74/490.04, 500.5, 89.23, 89.2; 474/59, 474/60, 61
See application file for complete search history.

(56) References Cited

U.S. PATENT DOCUMENTS

| | | |
|---|---|---|
| 2003/0074990 A1 | 4/2003 | Garrec |
| 2011/0056321 A1* | 3/2011 | Sim ..................... B25J 9/1025 74/490.04 |
| 2011/0167945 A1* | 7/2011 | Yang ..................... B25J 9/104 74/490.04 |

* cited by examiner

CABLE ACTUATOR ALLOWING INCREASED JOINT CLEARANCE

CROSS REFERENCE TO RELATED APPLICATIONS

This application is a National Stage of International Application No. PCT/EP2014/056355 filed Mar. 28, 2014, claiming priority based on French Patent Application No. 13 53089 filed Apr. 5, 2013, the contents of all of which are incorporated herein by reference in their entirety.

The invention concerns a cable actuator allowing increased joint movement.

BACKGROUND OF THE INVENTION

Cable actuators including a screw/nut assembly the screw of which is driven in rotation by an electric motor and the nut of which is mobile in translation are known. The mobile element is coupled to one or more cables to exert traction thereon.

There is known from the document FR2809464 a cable actuator of this kind in which the element mobile in translation is the screw while the nut is driven in rotation by a motor. The cable enters a hole in the screw and is coupled by means of an attachment tolerating misalignments of the cable.

Such a cable actuator may be used to actuate a robot arm segment or finger bone. In these joints, the mobile element is rigidly connected to a rotary shaft that includes a pulley onto which the cable is wound. To increase the movement of such a joint beyond one rotation of the shaft, it is necessary to allow winding of the cable on itself, which has the disadvantage of increasing the primitive radius of the winding. Using a pulley with a helical groove whereby the primitive winding radius remains constant may be envisaged, but such a pulley causes progressive misalignment of the cable as the cable is wound, which generates transverse forces that interfere with the operation of the screw/nut assembly.

Moreover, in some applications, notably in robotic applications, the overall size of the actuator is highly critical and it is important to make this overall size as small as possible.

In this regard cable actuators are known that include a screw rotatably mounted and driven by an electric motor, a nut cooperating with the screw and associated with anti-rotation means such that rotation of the screw by the motor causes axial movement of the nut, and two substantially parallel cables coupled to the nut on either side thereof.

For the same travel, this device makes it possible to reduce the overall size of the cable actuator. In fact, in known cable actuators in which the or each cable is coupled to the screw that moves, it is necessary to allow the screw to project on either side of the actuator. The general overall size would therefore be at least 2C+L, where C is the stroke of the actuator and L the overall size of the nut. In the actuator in which the nut moves, this minimum overall size is only C+L.

OBJECT OF THE INVENTION

An object of the invention is to propose a cable actuator of the aforementioned type allowing increased movement of the associated joint.

SUMMARY OF THE INVENTION

With a view to achieving the above objective, there is proposed in accordance with the invention a cable actuator including a screw rotatably mounted and driven by an electric motor, a nut that engages with the screw and is combined with anti-rotation means such that rotation of the screw under the action of the motor causes axial movement of the nut, and two cables extending symmetrically with respect to a rotation axis of the screw and coupled to the nut on either side thereof, the two cables being wound onto respective pulleys both rigidly connected to the same rotary shaft and in which the pulleys are of the type that has a helical groove, the helical grooves of the pulleys extending in opposite directions.

The use of an actuator with two cables combined with two pulleys with helical grooves mounted in opposite directions makes it possible to maintain the winding radius constant and, by symmetry, to cancel lateral forces generated by the non-parallel disposition of the cables.

BRIEF DESCRIPTION OF THE DRAWINGS

The invention will be better understood after reading the following description of various embodiments of the invention with reference to the figures of the appended drawings, in which.

DETAILED DESCRIPTION OF THE INVENTION

Figure 1:
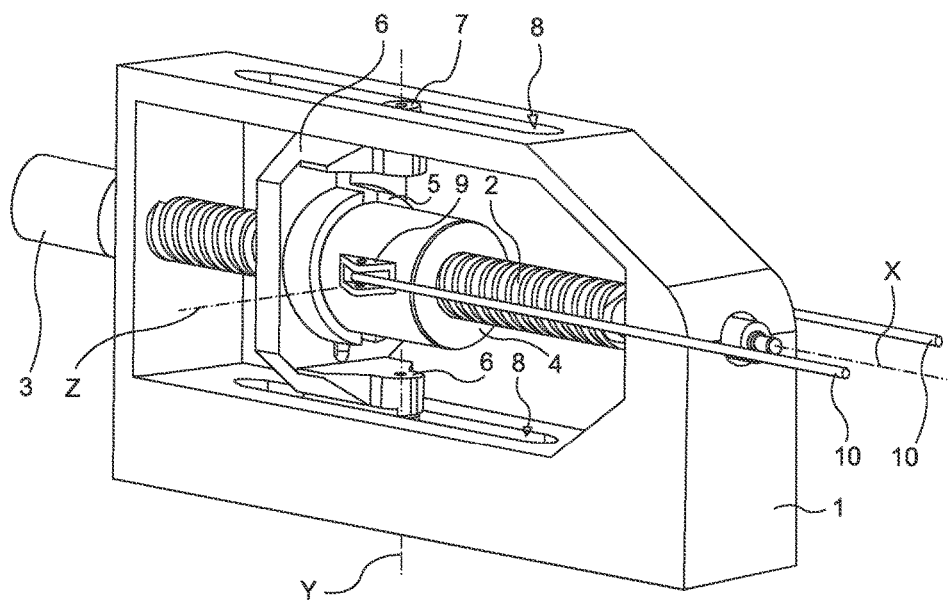
FIG. 1 is a partial perspective view of a cable actuator in accordance with one particular embodiment of the invention.

Referring to FIG. 1, the cable actuator of the invention includes a chassis 1 on which a screw 2 is mounted to turn about an axis X on being driven in rotation, here by an electric motor 3. A nut 4 cooperates with the screw 2 and is associated with an anti-rotation device 5 including two arms 6 that extend on either side of the nut 4 to carry rollers 7 (only one can be seen here) that are mounted to turn about an axis Y normal to the axis X. The rollers 7 are engaged in longitudinal openings 8 in the chassis that extend parallel to the axis X. The axis Y passes substantially through the center of the nut 4. The nut is therefore moved axially by the rotation of the screw, without turning about the axis X. However, angular deviations are allowed about the axis Y and also about an axis Z normal to the axes X and Y.

The nut 4 includes means 9 for coupling two cables 10 extending on either side of the nut 4 substantially symmetrically with respect to the axis X. Here the coupling means include two double yokes (only one can be seen here) that extend on either side of the nut 4.

Figure 2:
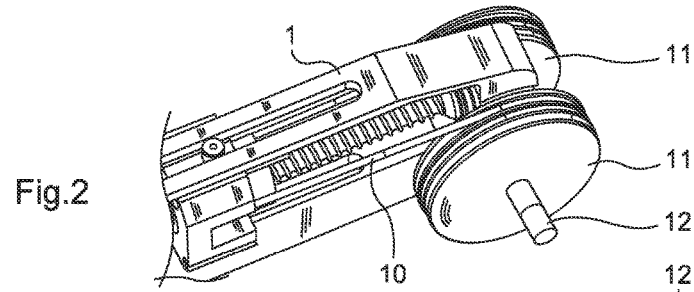
FIG. 2 is a perspective view of the actuator from FIG. 1 showing the rotary shaft of the joint.

As shown in FIG. 2, each cable 10 is wound around a respective pulley 11 with a helical groove, the two pulleys 11 being rigidly connected to the same shaft 12 mounted to rotate about an axis parallel to the axis Z. In the embodiment shown, the shaft 12 is rotatedly mounted directly on the chassis 1 but could be at a distance therefrom. The shaft 12 defines the axis of a joint (for example of an arm segment or a finger bone). The pulleys 11 are therefore referred to as joint pulleys.

Figure 3A:
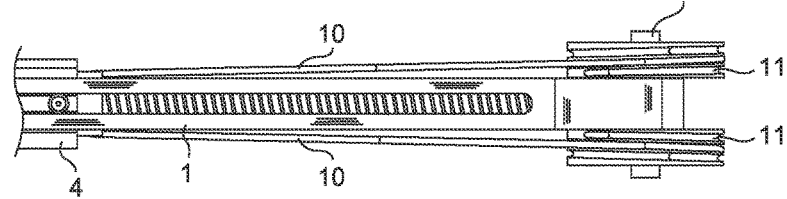
FIGS. 3A and 3B are plan views of the actuator from FIGS. 1 and 2 for two axial positions of the nut.
Figure 3B:
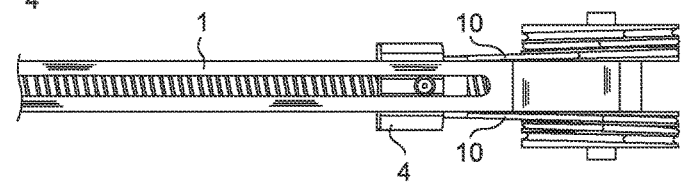

In accordance with the invention, the helical grooves of the joint pulleys 11 extend in opposite directions, as seen better in FIGS. 3A and 3B in which it is seen that the cables are not entirely parallel to the axis X but inclined relative to the axis X at a small angle α corresponding to the angle φ of the helical grooves. However, the two cables 10 being inclined at opposite angles, the lateral forces generated by the two cables 10 cancel out through symmetry.

Figure 4:
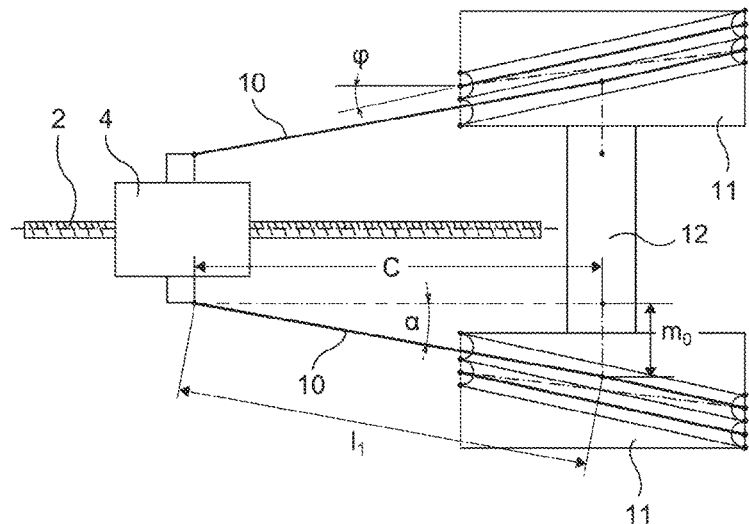
FIG. 4 is a theoretical schematic of the cable actuator of the invention, the angles of the cables being exaggerated.

To minimize the risks of wear of the cable and the flanks of the groove, this angle must be constant during movement of the nut 4 in order to guarantee alignment of the cable with the groove of the associated joint pulley 11 at the winding point. In particular the angle α must be made equal to the helix angle φ of the associated helical pulley by means of an initial calibration $(m_0, l_0)$ such that $\sin \varphi = m_0/l_0$, where $m_0$ is the lateral offset of the cable for a given length $l_0$ of cable between the point at which it is coupled to the nut 4 and the point at which it is wound onto the associated pulley. The angle φ is shown in FIG. 4. It must of course be understood that the angle φ is the angle made by the helix of the groove when it is unwound. If such a condition is complied with, a linear relation is obtained between the rotation angle of the shaft 12 and the travel of the nut 4: $C(\theta) = R \cdot \theta$.

The shaft 12 is therefore driven in rotation as soon as traction is exerted on the cables by movement of the nut 4. In a manner known in itself, the cables 10 are kept taut by disposing the cables in a loop between two pulleys, for example (as in the document FR2809464), or, if only a unidirectional action is required, by means of a tension spring.

Figure 5:
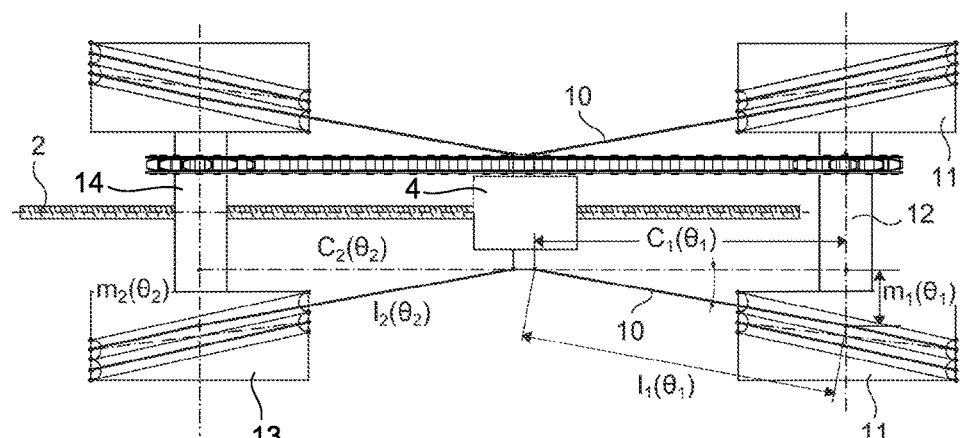
FIG. 5 is a schematic of a variant of the cable actuator of the invention with idler pulleys with helical grooves, the angles of the cables being exaggerated.

If a bilateral action is required, the cables 10 must be tightened by winding them not only onto the joint pulleys 11 but also onto idler pulleys 13 both rigidly connected to the same idler shaft 14 here mounted to rotate on the chassis 1 (opposite the joint shaft 12) about an axis parallel to the rotation axis of the joint shaft 12. As can be seen in FIG. 5, the idler pulleys 13 here have helical grooves. If $k = R_2/R_1$ is the ratio of the primitive winding radii of a joint pulley 11 and an idler pulley 13 of the same cable, then the angular speeds of the joint shaft 12 and the idler shaft 14 must satisfy $k = \omega_1/\omega_2$. The actuator will then be equipped with rotary connecting means between the two shafts (for example toothed belts, chains) producing the condition of proportionality of the rotation speeds of the two shafts.

The invention is not limited to what has just been described and encompasses any variant within the scope of the invention as defined by the claims.

The invention claimed is:

1. A cable actuator including:
a chassis;
a screw rotatably mounted on the chassis and driven by an electric motor;
a nut that engages with the screw and is combined with anti-rotation means such that rotation of the screw under the action of the motor causes an axial movement of the nut;
two distinct cables extending symmetrically with respect to a rotation axis of the screw and coupled to the nut on either side thereof;
wherein the two cables are wound onto respective joint pulleys both rigidly connected to the same joint shaft so that the respective cables both wind on their respective pulleys for a first direction of rotation of the same joint shaft, and in which the joint pulleys are of the type that has a helical groove, the helical grooves of the pulleys extending in opposite directions;
wherein the respective joint pulleys have a constant diameter.

2. The cable actuator as claimed in claim 1, further including idler pulleys with helical grooves rigidly connected to a same idler shaft, the cables being wound onto a respective joint pulley and a respective idler pulley, the helical grooves of the idler pulleys extending in opposite directions.

3. The cable actuator as claimed in claim 2, wherein the same joint shaft and an idler shaft are interconnected by connecting means imposing proportionality between the rotation speeds of the two shafts.

4. A cable actuator including:
a chassis;
a screw rotatably mounted on the chassis and driven by an electric motor; a nut that engages with the screw, the nut locked against rotation such that rotation of the screw under the action of the motor causes an axial movement of the nut;
a first cable and a distinct second cable, the first cable extending on one side of a rotation axis of the screw and coupled to the nut on one side of the nut;
a second cable, distinct from the first cable, the second cable extending on another side of the rotation axis of the screw and coupled to the nut on a second side of the nut; a first pulley around which a portion of the first cable is wound; a second pulley around which a portion of the second cable is wound; the first pulley and the second pulley are rigidly coupled to rotate together about a common pulley rotational axis, so that rotation of the first pulley and the second pulley cause the first cable and the second cable to wind in a same direction;
the first pulley comprises a first helical groove about the common pulley rotational axis and the second pulley comprises a second helical groove about the common pulley rotational axis, the first helical groove extending in a direction at an angle with respect to the common pulley rotational axis that differs from that of the second helical groove;
wherein the first and second pulleys each have a constant diameter.

5. The cable actuator as claimed in claim 4, further comprising:
a first idler pulley operatively coupled to the first pulley;
a second idler pulley operatively coupled to the second pulley;
the first idler pulley and the second idler pulley rigidly coupled to rotate together about a common idler pulley rotational axis;
the first idler pulley comprises a first idler helical groove about the common idler pulley rotational axis and the second idler pulley comprises a second idler helical groove about the common idler pulley rotational axis, the first idler helical groove extending in a direction at an angle with respect to the common idler pulley rotational axis that differs from that of the second idler helical groove.

6. The cable actuator as claimed in claim 5, wherein the first idler pulley is operatively coupled to the first pulley by the first cable and the second idler pulley is operatively coupled to the second pulley by the second cable.

7. The cable actuator as claimed in claim 5, wherein the first pulley and the second pulley are rigidly coupled to rotate together by a pulley joint shaft and the first idler pulley and the second idler pulley are rigidly coupled to rotate together by an idler pulley joint shaft; and wherein the pulley joint shaft and the idler joint shaft are operatively connected by a toothed belt or chain imposing proportionality between rotation speeds of the pulley joint shaft and the idler joint shaft.

\* \* \* \* \*